April 12, 1966
H. E. WARDEN ETAL
3,245,219
STALL-SURGE SONIC SENSOR AND CONTROL APPARATUS
FOR TURBO-COMPRESSOR TYPE GAS ENGINES
Filed Nov. 24, 1958
2 Sheets-Sheet 1
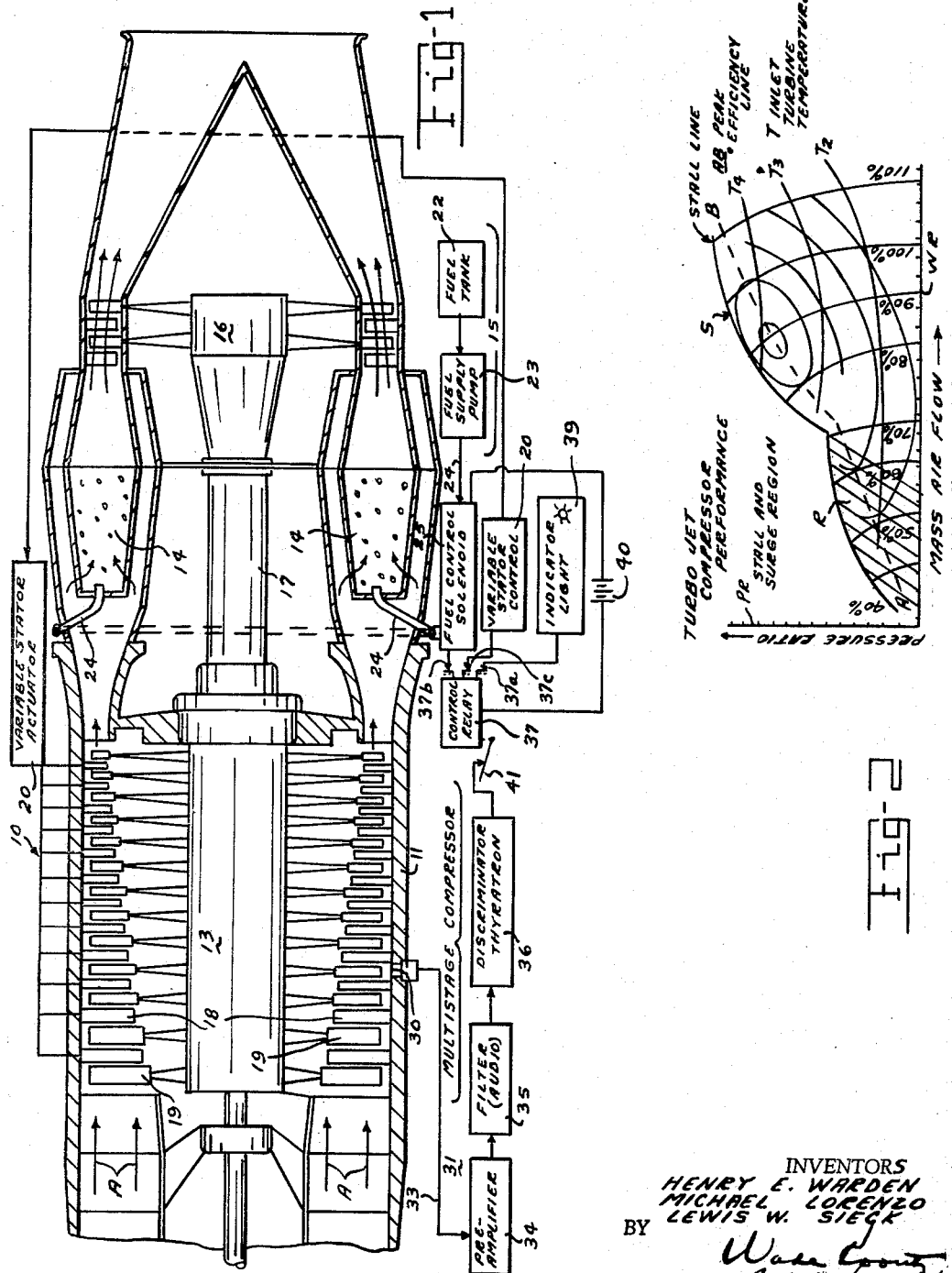
INVENTORS
HENRY E. WARDEN
MICHAEL LORENZO
LEWIS W. SIECK
BY
ATTORNEYS

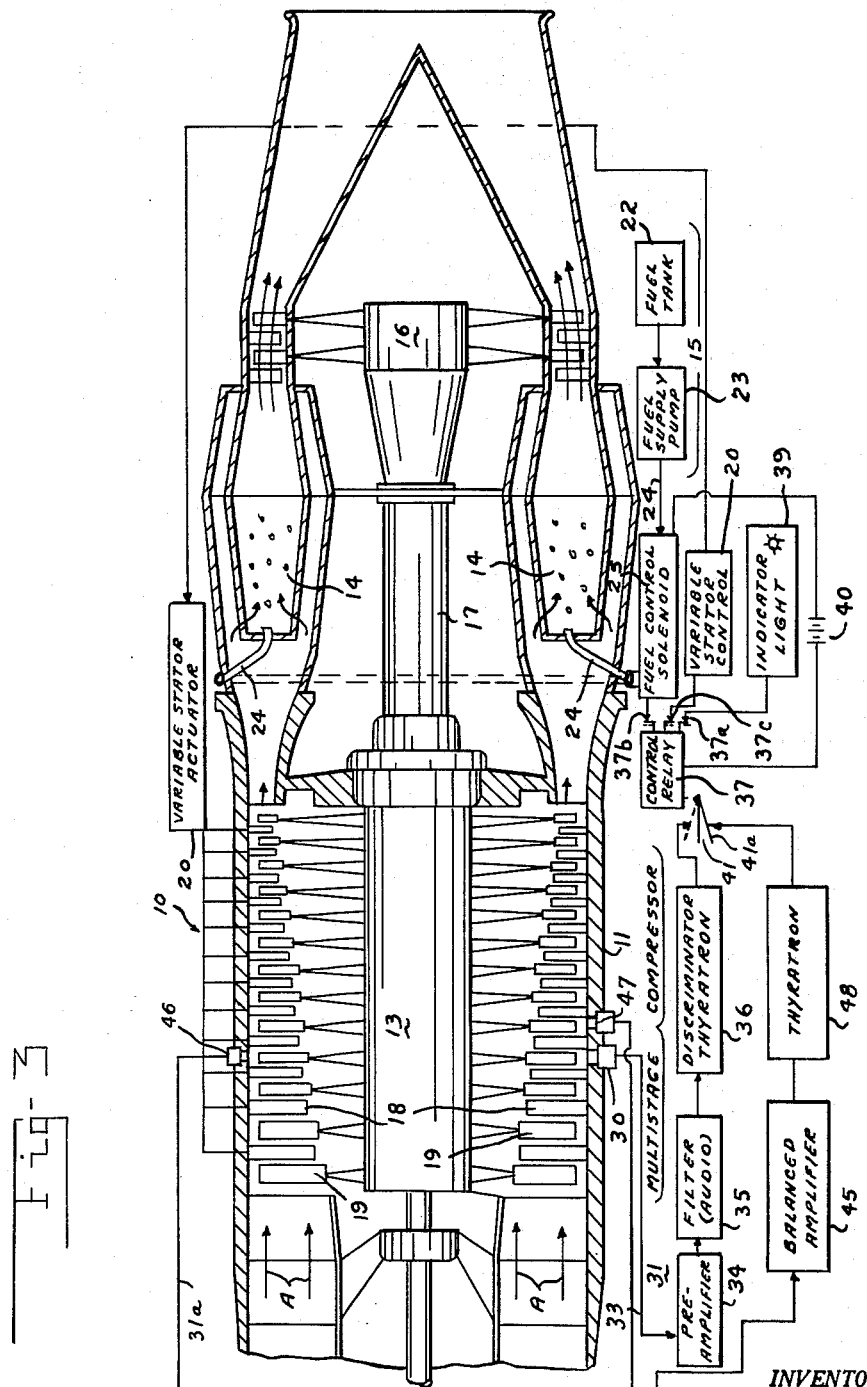

United States Patent Office 3,245,219
Patented Apr. 12, 1966

3,245,219
STALL-SURGE SONIC SENSOR AND CONTROL APPARATUS FOR TURBO-COMPRESSOR TYPE GAS ENGINES
Henry E. Warden, Box 4186, Patrick AFB, Fla.; Michael Lorenzo, 528 Shadeland Drive, Falls Church, Va.; and Lewis W. Sieck, 1632 Choctaw Trail, Maitland, Fla.
Filed Nov. 24, 1958, Ser. No. 776,150
5 Claims. (Cl. 60—39.28)

The invention described herein may be manufactured and used by or for the United States Government for governmental purposes without payment to us of any royalty thereon The present invention relates to an apparatus for sensing and controlling the performance level of compressors and the like.

The present invention has more particular relation to an electroacoustical device for the instantaneous, accurate sensing and correction of prestall and presurge conditions in a gas turbine compressor unit and in such a way as to prevent any substantial development of these conditions in the compressor which might affect the normal operating characteristics of the turbine and ultimately result in engine failure or loss of performance. The present invention is further capable of application as a ground testing device in the initial design of compressor units to prevent the development of stall and surge and also as an operational device either installed or as a separate item of equipment for detection and control of stall and surge conditions. Moreover, the device is more broadly conformable for use in the measurment and control of all types of sound producing devices wherein the sound frequencies produced are indicative of the operational levels of the device.

In gas turbine power plants, the compressor units and particularly those of the axial-flow type, commonly cause the entire turbine unit to fail or suffer critical losses in efficiency due to the development of a stall or surge condition in the compressor unit. Unfortunately, stall and surge can be brought about by a number of different factors and may occur at very unpredictable times during flight operations. For instance, a rotating stall condition commonly starts in the inlet compressor stages of the compressor and low speed values, whereas compressor stall, which is normally brought about by an excessive angle of attack of the compressor blades, can be initiated at various stages of the compression depending upon operating conditions; at the same time, surge is evidenced by an uncertain flow condition throughout the compressor and can normally be attributable to the occurrence of some type of stall in the unit.

As a consequence, it is very difficult to control the compressor unit to operate within a given range of performance without the problem of stall and surge arising. Furthermore, it is very difficult to detect this stall and surge condition before it reaches a point where it will seriously affect the performance of the power plant and possibly cause total failure or flameout of the turbine.

To obviate the foregoing difficulties, a unique way of analyzing the operational characteristics of the compressor unit is proposed by which it is possible to immediately sense and signal prestall and presurge conditions in the compressor. Also, the solution proposed makes possible the detection of such conditions in sufficient time to permit correction in the operation of the compressor to prevent the occurrence of stall, regardless of the factors influencing or causing the prestall or presurge condition. It has been found experimentally that it is possible to analyze and record the operational characteristics of a compressor unit in terms of discrete sonic frequencies generated by the compressor during operation. It is, therefore, proposed to correlate the sonic frequencies produced in the compressor with the performance characteristics of the compressor and to control the operation of the compressor as a result of this information. The above is accomplished in the present invention by electroacoustically monitoring the sonic frequencies propagated in the operation of the compressor unit and translating the frequencies into a useable signal which may be controlled to provide automatic correction in the operation of the compressor, or to provide an indicator to permit manual correction of the compressor by the pilot and thereby prevent the prestall and presurge conditions from progressing.

Accordingly, it is an object of the present invention to provide for the discrimination of compressor presurge and prestall conditions and consequent prevention of the development of surge and stall thereby avoiding engine failure, compressor structural failure and resulting accidents in flight operations.

It is another object to provide means to accurately sense and detect the performance level of compressor units and the like during operation so as to provide for greater efficiency in operation and avoidance of engine and compressor failure.

It is another object to provide for means for detecting and correlating the variations in sonic frequencies propagated by a compressor with the operational characteristics of the unit; to provide for translation of the sonic frequencies detected into a useable signal; and further to provide for manual or automatic correction in the performance level of the compressor in relation to the signals produced.

It is still a further object to provide for a sensing and correcting apparatus to relate the beginning of any one of a number of distinct and critical deterents to the operation of a compressor in such a way as to permit the automatic correction in the operation of the compressor and to prevent further development of the condition and impairment in the operation of the compressor.

Other objects and advantages of the present invention will become more apparent from the following description taken together with the accompanying drawings in which:

FIGURE 1 is a schematic view, partly in section, illustrating a gas turbine power plant with the sonic sensor apparatus in connected relation thereto in accordance with the present invention; and FIGURE 2 is a compressor performance diagram illustrating the performance of a compressor as affected by the total compressor ratio plotted against equivalent weight flow for constant values of equivalent speed and further showing the stall and surge regions of the compressor.

FIG. 3 is a view similar to FIG. 1, but showing a slight modification.

With more particular reference to the drawing, there is shown in FIGURE 1 a preferred embodiment of the present invention in combination with a gas turbine power plant 10 comprised generally of an outer housing or shell 11 for inclosing a multistage axial flow compressor unit 13 for the pressurized flow of air into a series of combustion chambers 14 which are supplied with fuel from a fuel system 15 for combustion with the air and expansion through a turbine unit 16 having a drive shaft 17 interconnecting the compressor 13 and turbine 16. As stated, the compressor unit 13 as shown is of the axial flow type which is especially susceptible to stall and surge conditions and includes a stator element 18 disposed on the inner wall surface together with rotor blade elements 19 mounted on the drive shaft 17 and also a variable stator control as schematically represented at 20.

To supply a metered amount of fluid into the combustion chambers 14 the fuel system 15 is made up of a fuel tank 22 for the supply of a suitable fuel to the supply pump 23 for flow through supply lines 24 into the combustion chambers. In order to control the amount of fuel consumption in the combustion chambers suitable control means may be provided such as a control valve as represented at 25 which includes an electrically responsive solenoid to regulate the amount of fuel flowing through the supply lines 24 into the combustion chamber.

Under normal operatnig conditions in flight, the air is induced into the front of the power plant 10 as indicated by arrows A, immediately boosted to a high pressure level in the compressor 13 and is then forced through the combustion chambers 14 for mixture with the fuel. It is, of course, necessary to properly control the operation of the power plant in order to attain the most efficient performance levels. An important factor in controlling the operation of the power plant is the operational characteristics of the compressor 13 which must be considered in relation to the increase in pressure of air through the compressor 13 and the rate of fuel consumption in the combustion chamber 14.

As shown in FIGURE 2, compressor performance can be plotted for a particular compressor as a function of the total pressure ratio across the compressor and the equivalent weight flow for constant values of equivalent speed which are denoted by the solid, vertically and horizontally extending lines PR and WR. The peak efficiency of the turbine can also be plotted as represented by the dotted line AB so that it is possible to determine the necessary operating conditions to determine the highest efficiency for a given equivalent speed and given inlet turbine temperature as represented by T ($T^2$, $T^3$, $T^4$). The stall and surge ranges for the compressor can also be determined and plotted with the upper curved line S denoting the stall-line above which the compressor stall and surge range exists and with the rotating stall range being represented by the shaded area R in the lower portion of the diagram.

It has been established that the development of stall and surge in a compressor can be attributed to a number of different factors which have no obvious relation to one another. Thus it is normally very difficult to predict when a prestall or presurge condition is developing in the compressor unit. At the same time one must be able to detect the condition in the beginning in order to correct the variable factors influencing the compressor operation and prevent further development of the stall and surge conditions. It has been found experimentally that a compressor unit or any rotating engine component will generate a discrete sonic frequency and intensity depending upon the speed characteristics of the compressor. Furthermore, the propagation of the sonic frequency generated will be dependent upon the medium surrounding the compressor blades 19 for instance, the density and elastic modulus of the working fluid, such as air, will have a pronounced effect on the sonic frequencies. The development of an incipient stall or surge condition first makes itself known by the disturbance in air flow through the compressor, usually in the low pressure stages in the compressor unit. Accordingly, the development of such a condition will affect the sonic frequencies generated during the operation of the compressor unit. Usually a pocket of reduced air pressure or partial vacuum will develop surrounding one or more compressor blades 19. Thus, although the compressor unit will be rotated at a normal speed, pulses or transients producing a periodically recurring discontinuity in the frequency response will be developed at a repetition frequency equal to the revolutions per minute of the compressor 13.

It is, therefore, proposed to electroacoustically monitor the sonic frequencies and pulses generated by the compressor and to develop an output signal corresponding to the sonic frequencies and pulses, then to apply the output signals to bring about proper control and correction of the power plant instrumentation. Once it is made possible to obtain an output signal representing the range of operation of the compressor various means may be devised to accurately control the power plant operation. As shown in FIGURE 1 the sensing and detecting of the sonic frequencies and pulses is accomplished by the disposition of an electroacoustical pickup device, such as an electronic microphone 30, at a predetermined location in the compressor housing. A control circuit 31 is then connected across the microphone 30 by means of leads 33, the control circuit serving to amplify and selectively filter the output signal received from the microphone 30 and to transmit a control signal indicating that the prestall or presurge condition is present in the compressor unit and then to automatically adjust anyone or several of the power plant instruments in order to prevent the prestall or presurge condition from progressing into a stall or surge condition.

The microphone 30 may be located adjacent the inlet to the compressor or, as shown, opposite the intermediate section of the compressor so as to be capable of receiving the sonic frequencies and pulses either developed in the inlet or outlet stages of the compressor or throughout the entire unit. The microphone 30 is inserted in the inner wall surface of the housing 11 and the connecting leads are passed outwardly through the housing for connection into the control circuit 31. The control circuit consists of a preamplifier 34 where sufficient audio gain of the input signal is made to overcome the loss from transmission through an audio filter 35, the filter 35 being preferably of the band pass type. The filter circuit is designed to selectively pass only those pulses in the range corresponding to the prestall and presurge range of performance. The output from the filter 35 is then fed through a discriminator thyratron 36 which is triggered upon the arrival of a succession of pulses falling within the frequency band corresponding to the pulse rapidity rate accompanying stall effects. In this way, the pulses generated by the occurrence of prestall or presurge condition in the compressor can be discriminated according to frequency and amplitude from the frequencies generated in the compressor 13 to provide a control signal. A signal-throw-multiple-pole relay 37 is electrically connected to the thyratron 36 to be responsive to the signal selectively passed therethrough. When the relay 37 is closed by the signal, one set of relay contacts 37a turns on a pilot indicator light or buzzer 39 to alert the pilot engineer that a stall condition is progressing in the compressor. A second set of contacts 37b is connected in series with a suitable D.C. voltage source 40 to automatically actuate the solenoid to control the fuel valve 25, or alternately another set of relay contacts 37c may be provided to vary the variable stator control 20. In addition, a switch 41 may be provided in connected relation with the relay to disconnect the automatic controls at the option of the pilot or engineer who may prefer to manually adjust the throttle or other corrective controls.

A further control circuit 31a is shown in FIGURE 3 which may be provided, consisting in the use of a balanced amplifier 45 into which are fed the output signals from two microphones 46 and 47 located on opposite sides of the compressor 13. When the incipient stall condition exists the microphones will automatically feed an unbalanced voltage into the amplifier 45 to trigger a thyratron 48; however, until the stall pulse occurs the output of the amplifier 45 will not be responsive to actuate the thyratron, since the bias condition of the balanced amplifier remains unchanged, it being, of course, understood that switch 41 is thrown to contact the contact 41a.

To determine the output of the audio filter 35 and the thyratron 36 it is first necessary to analyze the performance characteristics of the particular compressor unit 13 to be controlled in relation to the sonic frequency and pulses generated. This may be suitably accomplished generally by running a spectrum analysis on the compressor unit generally, two for each stage of the compressor to determine the frequency range of the pulses corresponding to an incipient stall or surge condition. By plotting an amplitude vs. frequency it is found possible to determine the amplitude of the pulses together with the frequency range the filter thyratron 36 (or 48) can then be preset accordingly to selectively pass only those signals falling within the frequency and amplitude range for the compressor unit to be controlled.

The sonic sensor apparatus as described may be equally applicable to gas turbine compressors in turbo-propeller, turbojet and industrial gas turbo engines, and is not limited only to the air vehicle turbo-jet as described above. By its application in gas turbine engine design, it is possible to maintain a better understanding of compressor efficiency patterns in general so as to enable more efficient design and development of the engines and also infuse in a power plant exhibit the greatest possible efficiency at the lowest possible noise level, further the sonic sensor control can be utilized to provide the best economy of operation by lowering the fuel consumption for a given power output. In addition, at the above application, the sonic sensor of the present invention may be used as a primary sensing and/or measuring device in conjunction with an engine analyzer with any type engine with control rotating components that exhibit a varying sound level. Thus, fingerprints of engine sound patterns may be obtained and used to discriminate between a malfunctioning engine and one that is standard or operating steadily. Moreover, the sonic sensor can be utilized in a system either by itself or in conjunction with other types of vibration, velocity and pressure pickup devices such as to provide an accurate preliminary measuring device.

While a preferred embodiment of the present invention has been illustrated and described it will be obvious to those skilled in the art that various changes and modifications may be made without departing from the spirit and scope of the invention as defined by the appended claims.

We claim:

1. In a gas turbine power plant having an axial flow compressor having low pressure and high pressure stages and a fuel flow control valve, in which said compressor generates discrete sonic frequencies varying in accordance with the operating range of said compressor and characterized by the development of a predetermined number of periodically recurring pulses in the sonic frequencies when said compressor approaches an operating range causing stall and surge conditions therein, a microphone mounted on said power plant adjacent said low pressure stages of said compressor to receive and develop input signals corresponding to the sonic frequencies and pulses generated in the low pressure stages of said compressor, a control circuit electrically interconnected between said microphone and said fuel flow control valve including means to amplify said signals with an audio filter for selectively passing said signals within a frequency range including said pulses generated and a thyratron circuit having a variable time constant including a discriminator responsive to pulses having the pulse rapidity rate accompanying stall and surge conditions passing through said filter to energize said thyratron and relay means energizable by said thyratron and connected to said fuel flow control valve to adjust the same in response to the energization of said thyratron to control the rate of fuel consumption of said power plant to prevent the progression of stall and surge conditions in said compressor.

2. In a gas turbine power plant including a multistage axial flow compressor having high and low pressure stages, rotary power means for driving said compressor, fuel control means for regulating the rate of rotation of said power means and said compressor in which said compressor generates discrete sonic frequency vibration pulses varying in accordance with the operating range of said compressor and characterized by the development of a predetermined number of recurrent pulses in the sonic frequencies when said compressor approaches an operating range causing stall and surge conditions, microphone means fixed in said power plant adjacent the low pressure stages of said compressor for developing output signals corresponding to the sonic frequencies and pulses generated by said compressor, a preamplifier connected to said microphone means to receive said output signals therefrom, an audio filter connected to said preamplifier to selectively pass signals received from said preamplifier within a predetermined frequency range including the sonic vibration pulses generated, a thyratron circuit including a thyratron and a discriminator connected to said audio filter responsive to pulses passing through said filter to energize said thyratron, relay means connected to said thyratron to be energized thereby, and means connected for operation by said relay means for actuating said fuel control means for controlling the rate of rotation of the compressor to prevent the continuation of said stall and surge conditions upon energization of said relay means.

3. In a gas turbine power plant having an axial flow compressor having low and high pressure stages feeding air into a plurality of combustion chambers having combustion discharge ends, a fuel flow control valve for feeding fuel into said combustion chambers, and turbine means for rotating said compressor disposed for rotation by the discharge through said discharge ends from said combustion chamber, said axial flow compressor comprising rotor blades and adjustable stator blades, a variable stator actuator for adjusting the angles of said stator blades relative to said rotor blades, said compressor having characteristics for generating discrete sonic frequency vibrations varying in accordance with the operating range of said compressor and characterized by the development of a predetermined number of periodically recurring vibration pulses in the sonic frequencies when said compressor approaches an operating range causing stall and surge conditions therein, a microphone mounted on said power plant adjacent said low pressure stages of said compressor to receive and develop input signals corresponding to the received sonic frequencies and pulses generated in the low pressure stages of said compressor, a control circuit electrically interconnected between said microphone and said fuel flow control valve including means to amplify said signals, an audio filter for selectively passing said signals within a frequency range including said pulses generated, and a thyratron circuit having a variable time constant including a discriminator responsive to pulses having the pulse rapidity rate accompanying stall and surge conditions passing through said filter to energize said thyratron, relay means operable by said thryatron, signal means connected to said relay means to indicate approaching stall and surge conditions in said compressor when said relay means is actuated and operating means between said relay means and said variable stator actuator for actuation thereof to adjust the angles of said stator blades relative to said rotor blades to counteract the development of stall and surge conditions in said axial flow compressor.

4. A stall preventer for a power plant having a multistage compressor which generates a discrete number of recurrent sonic frequency vibration pulses when approaching stall and surge conditions comprising, microphone means carried by said power plant adjacent said compressor in a plane intermediate the first and last stages of said compressor for receiving said recurrent sonic frequency vibration pulses from said compressor stages when said compressor approaches a stall and surge condition, a control circuit connected to said microphone means to be energized by said microphone means for generating recurrent electric signals at the rate of said sonic frequency vibration pulses, amplifier means in said control circuit for amplifying said recurrent electrical signals, an audio filter in said control circuit to selectively pass said signals which come within a frequency range including the range of said pulses generated by said compressor when said compressor approaches stall and surge conditions, and a thyratron connected in said circuit, and discriminating means in said circuit responsive only to the pulses passing through said audio filter of a frequency band corresponding to the pulse rapidity rate in said compressor accompanying stall and surge conditions to energize said thyratron, relay means connected to said thyratron to be operated thereby, and control means connected between said relay and said compressor to be operated for controlling the operating conditions of said compressor to be operated by said relay means when approaching said stall condition to eliminate the same.

5. A stall preventor for a turbine power plant having a multistage axial compressor which generates a discrete number of recurrent sonic frequency vibration pulses when approaching stall and surge conditions comprising, microphone means fixed on said power plant adjacent said axial compressor in a plane intermediate the first and last stages of said compressor for receiving said recurrent sonic frequency vibration pulses from said compressor stages when said compressor approaches a stall and surge condition, a control circuit connected to said microphone means to be energized by said microphone means for generating recurrent electrical signals at the rate of said sonic frequency vibration pulses including amplifier means in said control circuit for amplifying said recurrent electrical signals, an audio filter in said control circuit to selectively pass said signals which come within a frequency range including the range of said pulses generated by said compressor when said compressor approaches stall and surge conditions, and a thyratron connected in said circuit including discriminating means responsive only to the pulses passing through said audio filter of a frequency band corresponding to the pulse rapidity rate in said compressor accompanying stall and surge conditions to energize said thyratron and relay means connected to said thyratron to be operated thereby, and control means connected between said relay means and said compressor to be operated by said relay means for controlling the operating conditions of said axial compressor when approaching said stall condition to counteract the stall and surge conditions, in which said microphone means include a pair of microphones disposed at opposite sides of said axial flow compressor adjacent the inlet end thereof, and a balanced amplifier connected to said microphones, a thyratron device connected to said balanced amplifier to receive predetermined recurrent beat signals from said balanced amplifier responsive to predetermined surge and approach stall conditions of said compressor for feeding the last mentioned thyratron signals to said relay means for actuation of said relay means to actuate the means connected to the relay means for controlling the operating condition of the compressor to prevent stall and surge conditions from progressing through the compressor.

References Cited by the Examiner
UNITED STATES PATENTS

| | | | |
|---|---|---|---|
| 2,755,622 | 7/1956 | Nims | 60—39.28 |
| 2,807,932 | 10/1957 | Bodine | 60—39.09 |
| 2,851,855 | 9/1958 | Gamble | 60—39.28 |

JULIUS E. WEST, *Primary Examiner.*

SAMUEL FEINBERG, ARTHUR M. HORTON,
*Examiners.*

F. J. LEES, L. W. SANDERS, *Assistant Examiners.*